United States Patent [19]

Kurihara et al.

[11] Patent Number: 5,612,067
[45] Date of Patent: Mar. 18, 1997

[54] MOLDING APPARATUS FOR PRODUCING SYNTHETIC RESIN MOLDED PRODUCT

[75] Inventors: Tsuneo Kurihara; Katsushige Kusaka; Teruo Ichikawa; Hiromi Tanaka; Toshiyuki Higashi, all of Sayama, Japan

[73] Assignee: Honda Giken Kogyo Kabushiki Kaisha, Tokyo, Japan

[21] Appl. No.: 234,606

[22] Filed: Apr. 28, 1994

Related U.S. Application Data

[63] Continuation of Ser. No. 963,312, Oct. 20, 1992, abandoned.

[30] Foreign Application Priority Data

Oct. 22, 1991 [JP] Japan .................................. 3-274257
Oct. 22, 1991 [JP] Japan .................................. 3-274258

[51] Int. Cl.⁶ .......................... B29C 45/00; B29C 49/06
[52] U.S. Cl. ............... 425/533; 264/328.12; 264/328.13; 264/572; 425/546; 425/812
[58] Field of Search .................................. 425/572, 573, 425/574, 812, 150, 546, 533; 264/328.12, 328.13, 572

[56] References Cited

U.S. PATENT DOCUMENTS

| 5,069,858 | 12/1991 | Hendry | 425/812 |
|---|---|---|---|
| 5,090,886 | 2/1992 | Jaroschek | 425/572 |
| 5,098,637 | 3/1992 | Hendry | 264/328.13 |
| 5,127,814 | 7/1992 | Johnson et al. | 264/572 |
| 5,137,680 | 8/1992 | Hendry | 264/572 |
| 5,162,122 | 11/1992 | Loren | 425/812 |
| 5,162,230 | 11/1992 | Ziegler et al. | 264/572 |
| 5,198,177 | 3/1993 | Sugiyama et al. | 264/572 |
| 5,204,050 | 4/1993 | Loren | 425/812 |
| 5,250,238 | 10/1993 | Kiefer et al. | 425/150 |

FOREIGN PATENT DOCUMENTS

| 0250080 | 12/1987 | European Pat. Off. . |
|---|---|---|
| 0283207 | 9/1988 | European Pat. Off. . |
| 2-215516 | 8/1990 | Japan . |
| 2202181 | 9/1988 | United Kingdom . |
| 2232632 | 12/1990 | United Kingdom . |

*Primary Examiner*—Jay H. Woo
*Assistant Examiner*—Joseph Leyson
*Attorney, Agent, or Firm*—Armstrong, Westerman, Hattori, McLeland & Naughton

[57] ABSTRACT

A molding apparatus for producing a synthetic resin molded product including a forming mold with a molding cavity, a gate communicating with the cavity, and an overflow chamber communicating with the cavity through a flow-out passage, a gas blow-in mechanism for blowing gas into molten synthetic resin which has been injected into the cavity through the gate so as to form a void in the molten synthetic resin in the cavity to mold a hollow product and a flow-out passage opening and closing mechanism for closing the flow-out passage until the molten resin fills the molding cavity and opening the flow-out passage when the gas blow-in mechanism is in operation.

2 Claims, 8 Drawing Sheets

MOLDING APPARATUS FOR PRODUCING SYNTHETIC RESIN MOLDED PRODUCT

This application is a continuation of application Ser. No. 07/963,312 filed Oct. 20, 1992, now abandoned.

BACKGROUND OF THE INVENTION

1. Field of the Invention

The field of the present invention is a molding apparatus for producing a synthetic resin molded product, and particularly, a molding apparatus for producing a molded product by utilizing an injection molding process, comprising a forming mold which includes a molding cavity, a gate communicating with the molding cavity, and an overflow chamber communicating with the molding cavity.

2. Description of the Prior Art

There is a conventionally known molding apparatus of such a type including, in order to form a hollow molded product, a gas blow-in mechanism for blowing gas into molten synthetic resin, which has been injected into the molding cavity, through the gate so as to form a void in the molten synthetic resin, which has been and a flow-out passage always open to the overflow chamber (see for example, Japanese Patent Application Laid-open No. 215516/90). Herein, the term "hollow molded product" means a shell-like molded product having a void over the entire region thereof and also a molded product having a void in a portion thereof.

With the above prior art apparatus, however, when the molten synthetic resin has been injected into the cavity, the resin tends happens to flow out through the flow-out passage into the overflow chamber. When such a situation occurs, the following problems are encountered: An injection pressure is insufficiently effected to the molten synthetic resin in the molding cavity, resulting in a deteriorated outer surface of the hollow molded product; and the amount of the resin in the cavity is insufficient, resulting in a hole generated in the body of the hollow molded product caused by the blown gas, and resulting in a non-uniform wall thickness.

In the injection molding process, after forming the molded product by injecting the molten synthetic resin into the molding cavity, a dwell pressure is required for inhibiting the shrinkage of the molded product. It is a conventional practice to provide such a dwell pressure by setting the injection pressure of the molten synthetic resin at a high level.

With the prior art apparatus, however, when the molded product is large in size, the injection pressure must be correspondingly increased. Therefore, to inhibit the generation of a flash, a mold clamping force must be increased, resulting in a problem of an increase in equipment cost.

SUMMARY OF THE INVENTION

It is an object of the present invention to provide a molding apparatus of the type described above, wherein in injecting molten synthetic resin into the cavity, the flow-out of the resin into the overflow chamber can be inhibited, thereby providing a hollow molded product of high quality.

To achieve the above object, according to the present invention, there is provided a molding apparatus for producing a synthetic resin molded product, comprising a forming mold including a molding cavity, a gate communicating with the molding cavity, and an overflow chamber communicating with the molding cavity through a flow-out passage; and a gas blow-in mechanism for blowing gas into molten synthetic resin injected into the cavity through the gate so as to form a void in the molten synthetic resin in order to mold a hollow molded product, wherein the apparatus further includes a flow-out passage opening and closing mechanism for closing the flow-out passage until the molten synthetic resin fills the molding cavity, and opening the flow-out passage when the gas blow-in mechanism is in operation.

With the above construction, since the flow-out passage is closed until the molten synthetic resin fills the molding cavity, the injection pressure is sufficiently effected to the molten synthetic resin in the molding cavity, thereby enabling the surface of the molten synthetic resin in contact with an inner surface of the cavity to be smooth. The contact surface is cooled by the mold and is difficult to flow so that it ultimately forms a skin layer of the hollow molded product. The flow-out passage is open when the gas blow-in mechanism is in operation. Therefore, when a high pressure gas is blown into the molten synthetic resin, the void is smoothly formed in the molten synthetic resin so as to provide the hollow molded product while permitting excessive resin to flow through the flow-out passage into the overflow chamber. A high gas pressure is equally applied to the inside of the hollow molded product and hence, the uniformalization of the wall thickness is achieved to avoid the generation of a shrink mark.

In this manner, it is possible to produce a high quality hollow molded product having a smooth outer surface and a uniform wall thickness.

It is a further object of the present invention to provide a molding apparatus of the type described above with low equipment cost, which can provide a sufficient dwell pressure without an increase in injection pressure of the molten synthetic resin, thereby inhibiting the generation of a flash.

To achieve the above object, according to the present invention, the molding apparatus includes a dwell pressure applying mechanism for blowing gas into the overflow chamber to apply a dwell pressure to the hollow molded product.

With the above construction, the injection pressure applied to the molten synthetic resin does not serve as a dwell pressure and hence, is set at a relatively low level, thereby inhibiting the generation of a flash. Instead, a sufficient dwell pressure is applied to the hollow molded product by the dwell pressure applying mechanism, thereby ensuring that the generation of a shrink mark in the hollow molded product is remarkably inhibited by the dwell pressure.

The dwell pressure applying mechanism can also be used in the production of a solid molded product, and even in this case, a similar effect can be obtained.

The above and other objects, features and advantages of the invention will become apparent from the following description of the preferred embodiments, taken in conjunction with the accompanying drawings.

DESCRIPTION OF THE PREFERRED EMBODIMENTS

Figure 1:
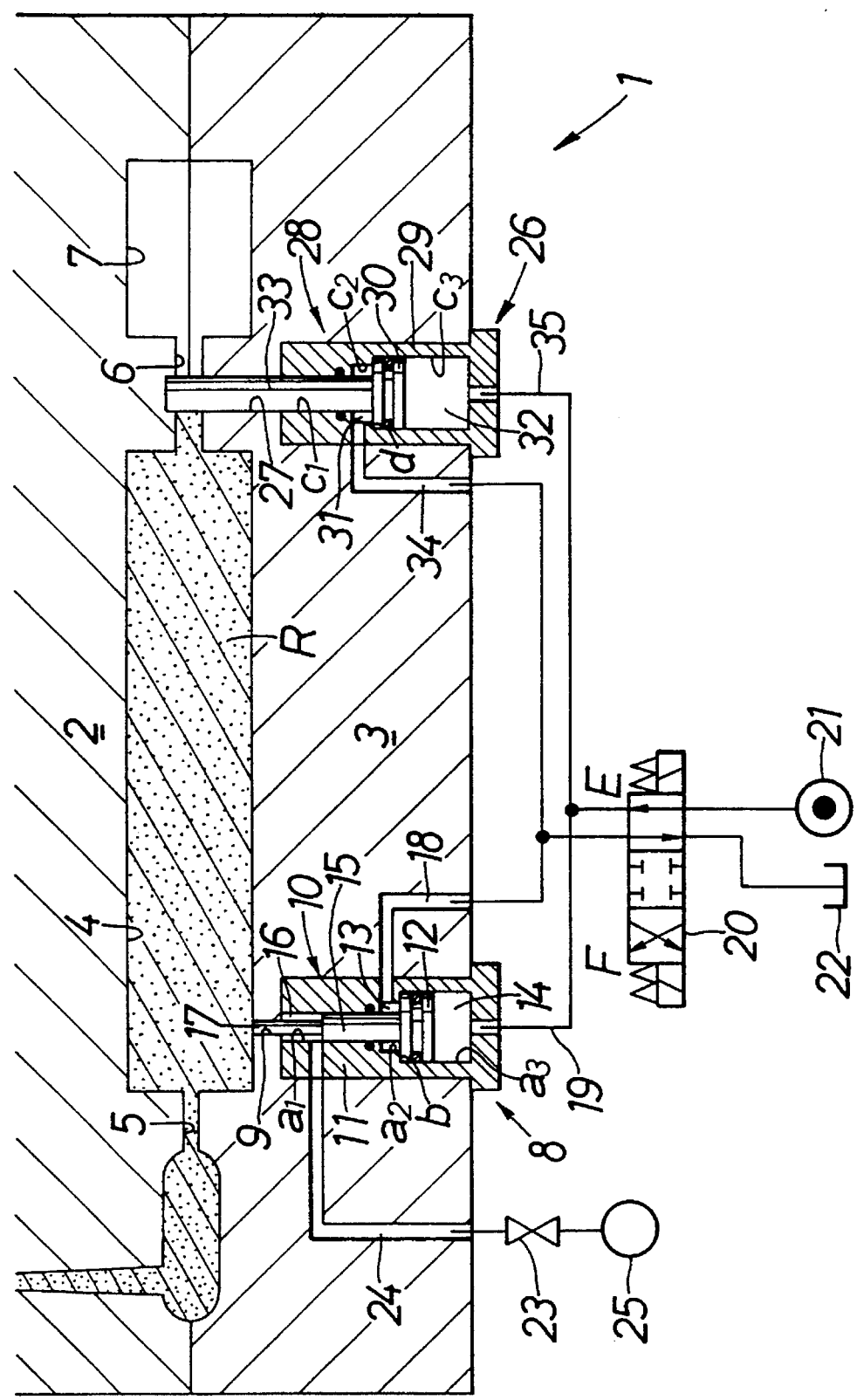
FIG. 1 is a longitudinal sectional view of a molding apparatus according to a first embodiment of the present invention, illustrating a condition in which molten synthetic resin has filled a cavity.
Figure 2:
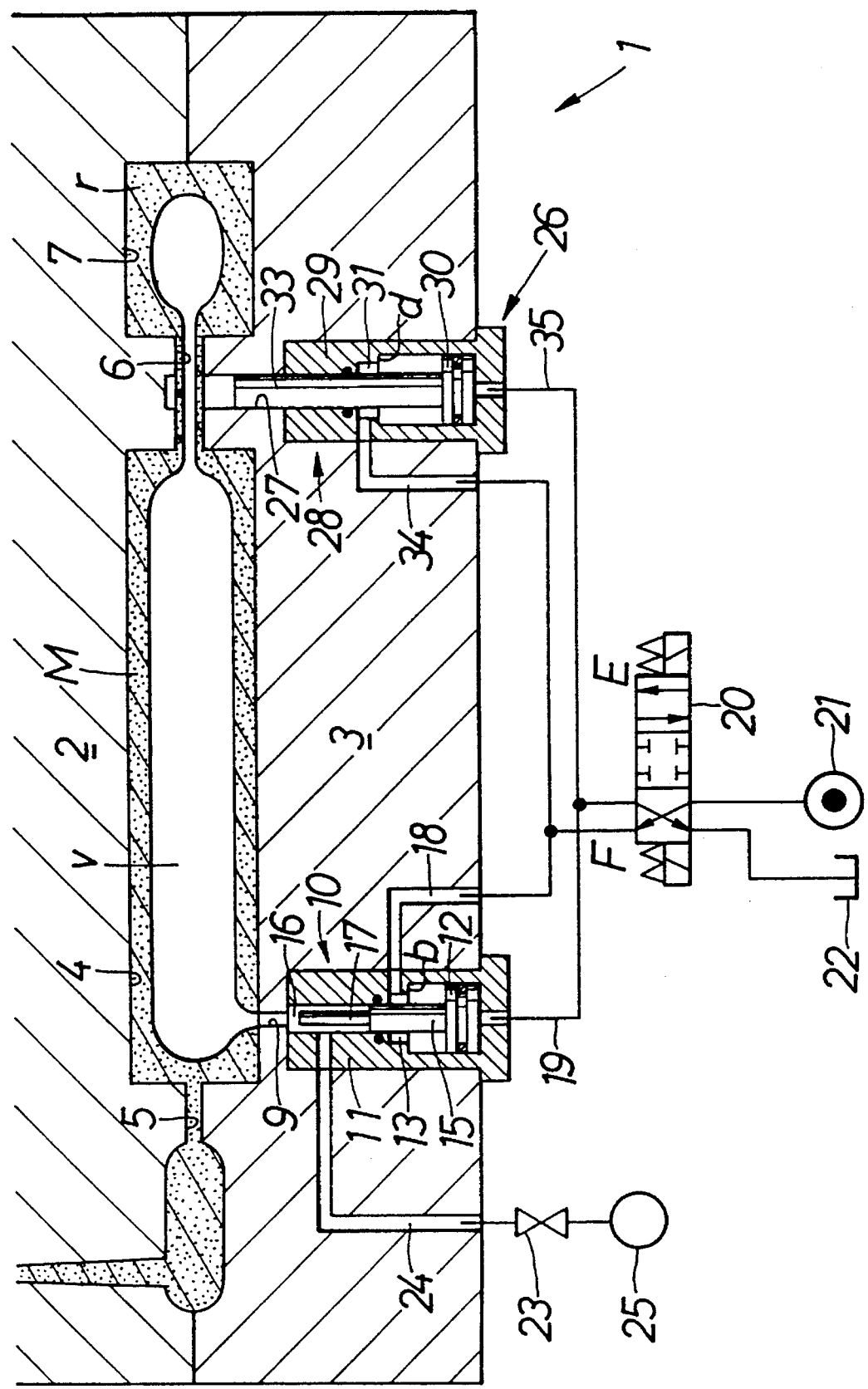
FIG. 2 is a longitudinal sectional view of the molding apparatus shown in FIG. 1, illustrating a condition in which gas has been blown into the molten synthetic resin filling the cavity.

FIGS. 1 and 2 illustrate a first embodiment of the present invention.

Referring to FIG. 1, a forming mold 1 is comprised of a stationary die 2 and a movable die 3. Both the dies 2 and 3 define a cylindrically-shaped forming cavity 4, a gate 5 communicating with one end of the cavity 4, and an overflow chamber 7 communicating with the other end of the cavity through a flow-out passage 6. The gate 5 communicates with an injection nozzle which is not shown. The flow-out passage 6 has a sectional area set smaller than that of the cavity 4.

In order to form a void in a molten synthetic resin injected into the forming cavity 4 through the gate 5, the movable die 3 is provided with a gas blow-in mechanism 8 for blowing a high pressure gas into the molten synthetic resin. The gas blow-in mechanism 8 is constructed in the following manner.

A gas blow-in hole 9 is provided in the movable die 3 in the vicinity of the gate 5, and a first hydraulic cylinder 10 is mounted in the movable die 3 for opening and closing the blow-in hole 9. A cylinder body 11 of the first hydraulic cylinder 10 has a small diameter bore $a_1$, a mean diameter bore $a_2$ and a large diameter bore $a_3$ arranged in sequence in the direction from the side of the blow-in hole 9 toward the outer side of the movable die 3. A piston 12 is slidably received in the large diameter bore $a_3$, so that the interior of the large diameter bore $a_3$ is divided by the piston 12 into a first hydraulic pressure chamber 13 on the side of the mean diameter bore $a_2$ and a second hydraulic pressure chamber 14 on the opposite side therefrom. A piston rod 15 integral with the piston 12 is slidably received in the small diameter bore $a_1$, so that a gas flow chamber 16 is defined by the piston rod 15 in the smaller diameter bore $a_1$ to communicate with the blow-in hole 9. The piston rod 15 has a rod-like valve member 17 integrally provided at a tip or leading end thereof and having a diameter smaller than that of the piston rod 15. The valve member 17 is adapted to be inserted into and removed out of the blow-in hole 9. There is a step b between the mean and large diameter bores $a_2$ and $a_3$. The step functions as a stopper for the piston 12. With the piston 12 mated with the step b, the valve member 17 is inserted into the blow-in hole 9 to close the latter.

The first and second hydraulic pressure chambers 13 and 14 are connected through oil passages 18 and 19 to first and second ports in a switchover valve 20, respectively. The pressure port in the switchover valve 20 is connected to a hydraulic pressure source 21 as an actuating source, and the return port in the switchover valve 20 is connected to an oil tank 22. The flow chamber 16 is connected to a supply source 25 for a pressure gas such as nitrogen gas through a gas passage 24 having a shut-off valve 23 therein.

Further, the movable die 3 is provided with a flow-out passage opening and closing mechanism 26 for opening and closing the flow-out passage 6. The flow-out passage opening and closing mechanism 26 is constructed in the following manner.

A guide hole 27 is provided in the movable die 3 to intersect and open to the flow-out passage 6, and a second hydraulic cylinder 28 is mounted in the movable die 3 for opening and closing the flow-out passage 6 through the guide hole 27. A cylinder body 29 of the second hydraulic cylinder 28 has a small diameter bore $c_1$, a mean diameter bore $c_2$ and a large diameter bore $c_3$ arranged in sequence in the direction from the side of the guide hole 27 toward the outer side of the movable die 3. A piston 30 is slidably received in the large diameter bore $c_3$, so that the interior of the large diameter bore $c_3$ is divided by the piston 30 into a first hydraulic pressure chamber 31 on the side of the mean diameter bore $c_2$, and a second hydraulic pressure chamber 32 on the opposite side therefrom. A rod-like valve member 33 integral with the piston 30 is slidably received in the small diameter bore $c_1$ and the guide hole 27 and adapted to intersect the flow-out passage 6. There is a step d between the mean and large diameter bores $c_2$ and $c_3$. The step functions as a stopper for the piston 30. With the piston 30 mated with the step d, the valve member 33 closes the flow-out passage 6.

The valve member 33 is formed of a material having a low thermal conductivity, e.g., a stainless material. This ensures that the molten synthetic resin in contact with the valve member 33 can be prevented from being solidified. It should be noted that a heater may be mounted in the valve member 33.

The first hydraulic pressure chamber 31 is connected through an oil passage 34 to the oil passage 18 which leads to the first hydraulic pressure chamber 13 in the gas blow-in mechanism 8. The second hydraulic pressure chamber 32 is connected through an oil passage 35 to the oil passage 19 which leads to the second hydraulic pressure chamber 14 in the gas blow-in mechanism 8.

The operation of molding a hollow molded product having a void over the entire region thereof will be described below.

(a) As shown in FIG. 1, in a condition in which the forming mold 1 has been closed, the switchover valve 20 is maintained in a first switchover position E, so that the first hydraulic pressure chambers 13 and 31 in the first and second hydraulic cylinders 10 and 28 are connected to the oil tank 22, and the second hydraulic pressure chambers 14 and 32 are connected to the hydraulic pressure source 21. The pistons 12 and 30 are operated to close the blow-in hole 9 by the advancement of the valve member 17 in the first hydraulic cylinder 10 and to close the flow-out passage 6 by the advancement of the valve member 33 in the second hydraulic cylinder 28.

(b) The shut-off valve 23 is opened, and the high pressure gas supply source 25 is operated to introduce a high pressure gas into the flow chamber 16.

(c) Molten synthetic resin R is injected from the injection nozzle through the gate 5 into the cavity 4. In this case, the flow-out passage 6 is maintained closed until the cavity 4 is filled up with the molten synthetic resin R. Therefore, the injection pressure is sufficiently applied to the molten synthetic resin R in the cavity to smooth the surface of the molten synthetic resin R in contact with an inner surface of the cavity 4. The resin surface is cooled by the mold 1 so that it becomes difficult to flow and ultimately forms a skin layer on a resulting hollow molded product.

(d) As shown in FIG. 2, the switchover valve 20 is shifted to a second switchover position F, so that the first hydraulic pressure chambers 13 and 31 in the first and second hydraulic cylinders 10 and 28 are connected to the hydraulic pressure source 21, and the second hydraulic pressure chambers 14 and 32 are connected to the oil tank 22. The pistons 12 and 30 are operated to open the blow-in hole 9 by the retreating movement of the valve member 17 in the first hydraulic cylinder 10 and to open the flow-out passage 6 by the retreating movement of the valve member 33 in the second hydraulic cylinder 28.

When the high pressure gas is blown through the blow-in hole 9 into the molten synthetic resin R, a void v is smoothly formed in the molten synthetic resin R, while permitting excessive resin r to flow through the floe-out passage 6 into the overflow chamber 7, thereby forming a hollow molded product The inner side portion of the molten synthetic resin R flows as the excessive resin r into the overflow chamber 7 because the contact surface with the inner surface of the cavity 4 is cooled by the forming mold 1 and is difficult to flow. Therefore, the surface of the molded product M cannot be roughened by such flowing-out of the excessive resin. A high gas pressure is equally applied to the inside of the hollow molded product M and hence, the wall thickness of the hollow molded product M is made uniform, thereby avoiding the generation of a shrink mark.

In this manner, a hollow molded product M having a smooth outer surface and a uniform wall thickness can be produced.

Since the gas blow-in mechanism 8 and the flow-out passage opening and closing mechanism 26 are operated by a single common hydraulic pressure source 21 and a single common switchover valve 20, the timing of the operations of the mechanisms 8 and 26 can be easily synchronized, and the apparatus can be made compact. However, the mechanisms 8 and 26 may be operated by separate actuating sources, respectively if desired.

Figure 3:
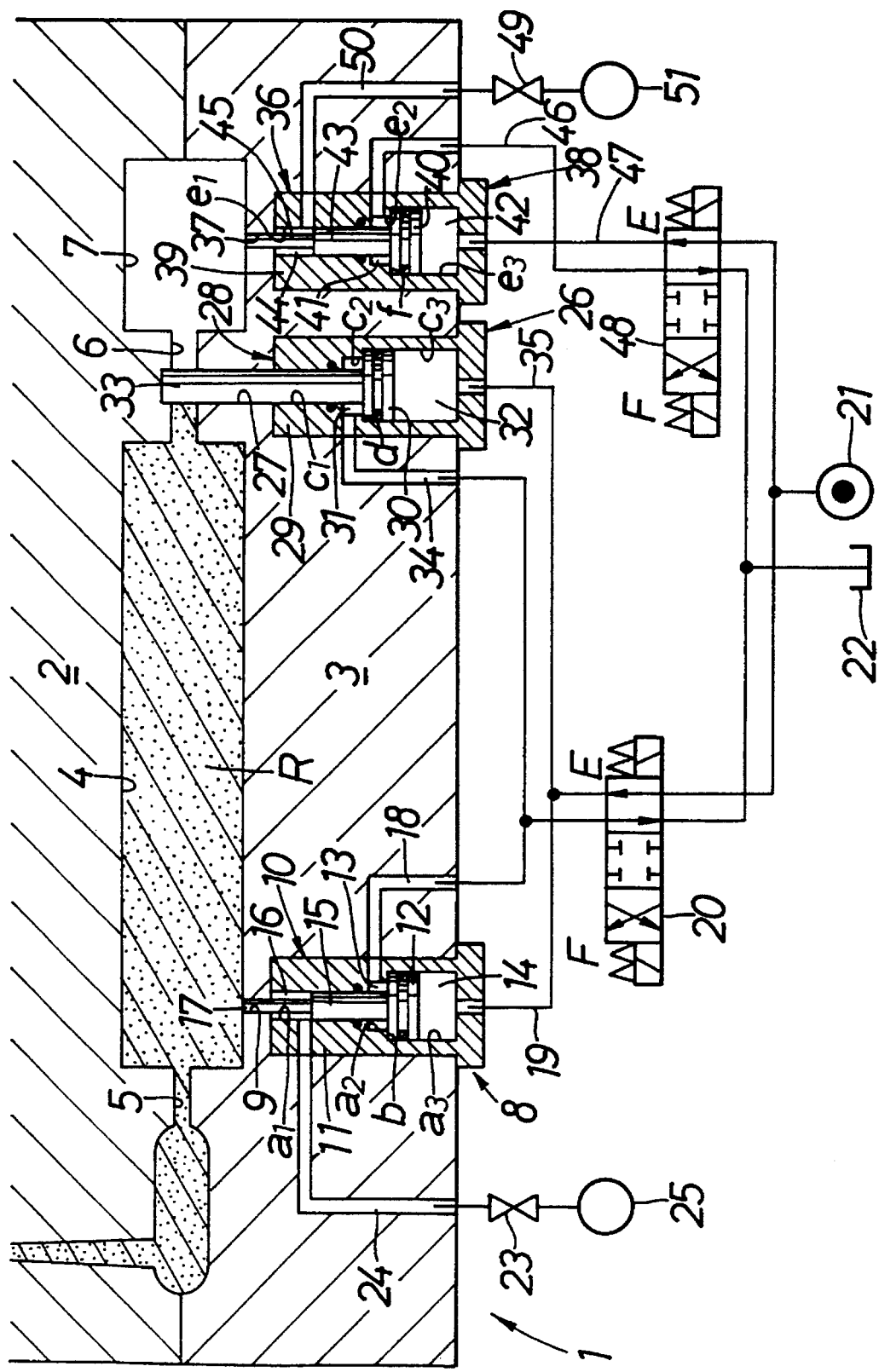
FIG. 3 is a longitudinal sectional view of a molding apparatus according to a second embodiment of the present invention, illustrating a condition in which molten synthetic resin has filled a cavity.
Figure 4:
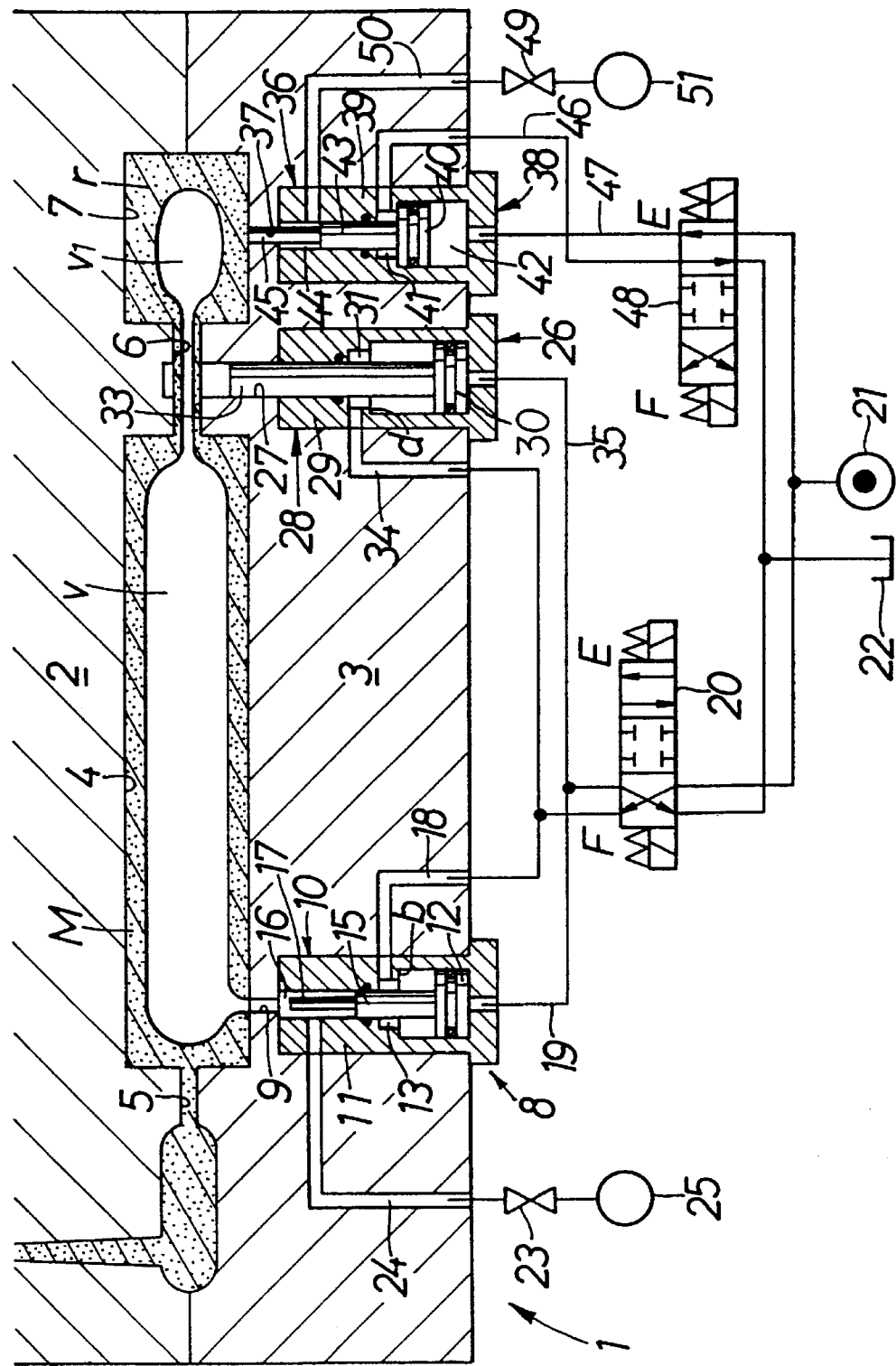
FIG. 4 is a longitudinal sectional view of the molding apparatus shown in FIG. 3, illustrating a condition in which gas has been blown into the molten synthetic resin filling the cavity.
Figure 5:
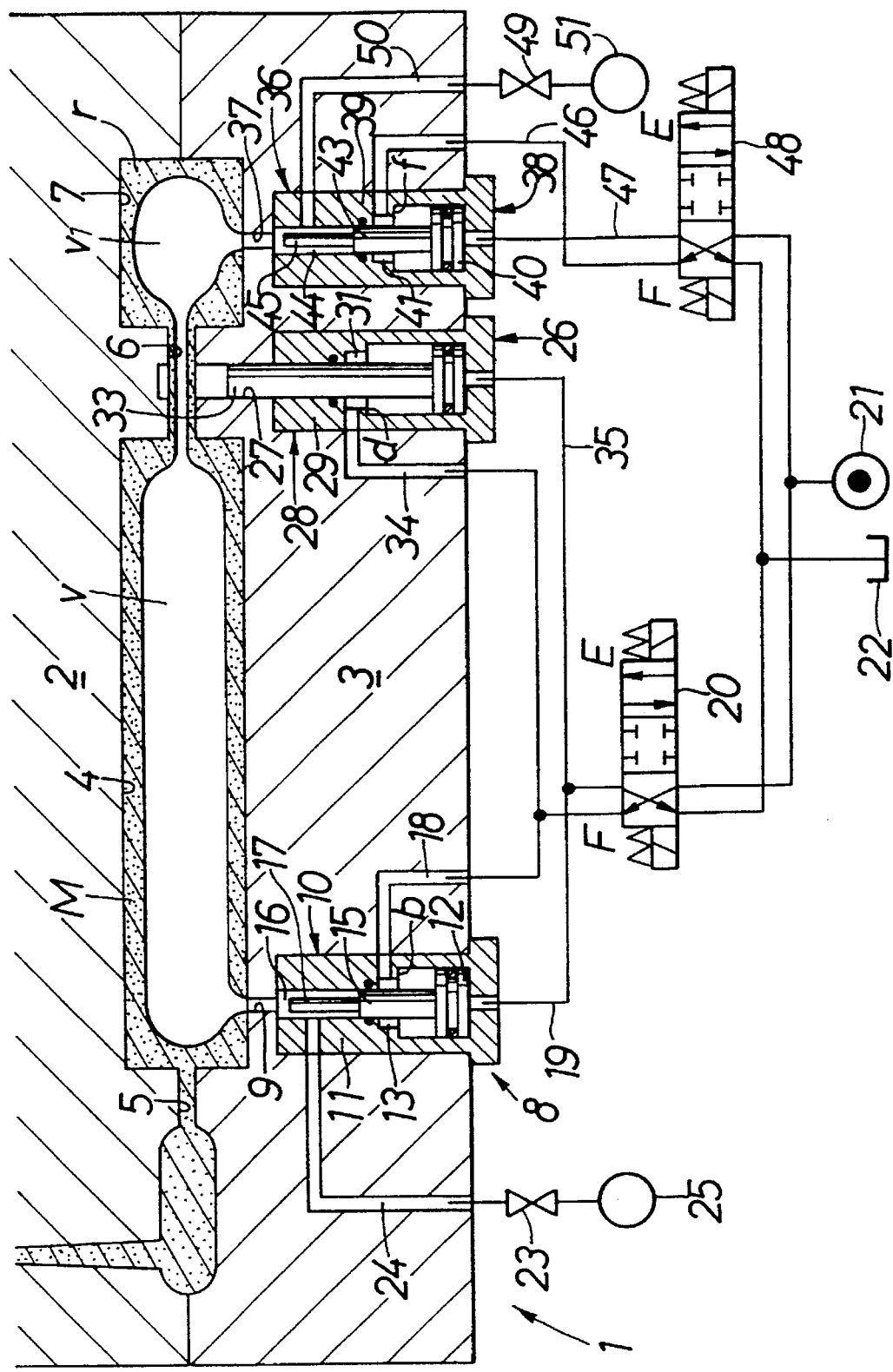
FIG. 5 is a longitudinal sectional view of the molding apparatus shown in FIG. 3, illustrating a condition in which a dwell pressure has been applied to a hollow molded product.

FIGS. 3 to 5 illustrate a second embodiment of the present invention. This embodiment is of a construction similar to that in the first embodiment, except that it further includes a dwell pressure applying mechanism 36 which is not provided in the first embodiment. Therefore, the same components as those shown in FIGS. 1 and 2 are designated by the like reference characters in FIGS. 3 to 5, and the description thereof is omitted.

The dwell pressure applying mechanism 36 is mounted on the movable die 3 and functions to apply a dwell pressure to the hollow molded product in the molding cavity 4 by blowing gas into the excessive resin flowing into the overflow chamber 7, for example, as a result of opening the flow-out passage 6 in the illustrated embodiment. The dwell pressure applying mechanism 36 is constructed in the following manner.

A gas blow-in hole 37 is provided in the movable die 3 to communicate with the overflow chamber 7, and a third hydraulic cylinder 38 is mounted in the movable die 3 for opening and closing the blow-in hole 37. A cylinder body 39 of the third hydraulic cylinder 38 has a small diameter bore $e_1$, a mean diameter bore $e_2$ and a large diameter bore $e_3$ arranged in sequence in the direction from the side of the blow-in hole 37 toward the outer side of the movable die 3. A piston 40 is slidably received in the large diameter bore $e_3$, so that the interior of the large diameter bore $e_3$ is divided by the piston 40 into a first hydraulic pressure chamber 41 on the side of the mean diameter bore $e_2$ and a second hydraulic pressure chamber 42 on the opposite side therefrom. A piston rod 43 integral with the piston 40 is slidably received in the small diameter bore $e_1$, so that a gas flow chamber 44 is defined in the small diameter bore $e_1$ by the piston rod 43 to communicate with the blow-in hole 37. The piston rod 43 has a rod-like valve member 45 integrally provided at a tip or leading end thereof and having a diameter smaller than that of the piston rod 43. The valve member 45 is adapted to be inserted into and removed out of the blow-in hole 37. A step f is provided between the mean and large diameter bores $e_2$ and $e_3$ and functions as a stopper for the piston 40. Thus, with the piston 40 mated with the step f, the valve member 45 is inserted into the blow-in hole 37 to close the latter.

The first and second hydraulic pressure chambers 41 and 42 are connected through oil passages 46 and 47 to first and second ports in a switchover valve 48, respectively. The pressure port in the switchover valve 48 is connected to the hydraulic pressure source 21, and the return port in the switchover valve 48 is connected to the oil tank 22. The flow chamber 44 is connected to a high pressure gas supply source 51 for supplying a high pressure gas such as nitrogen gas through a gas passage 50 having a shut-off valve 49 provided therein. The gas blowing pressure of the high pressure gas supply source 51 is set higher than the gas blowing pressure of the high pressure supply source 25 for the gas blow-in mechanism 8.

The operation of molding a hollow molded product having a void over the entire region thereof will be described below.

(a) As shown in FIG. 3, in a condition in which the forming mold 1 has been closed, the switchover valves 20 and 48 are maintained in their first switchover positions E, so that the first hydraulic pressure chambers 13, 31 and 41 in the first, second and third hydraulic cylinders 10, 28 and 38 are connected to the oil tank 22, and the second hydraulic pressure chambers 14, 32 and 42 are connected to the hydraulic pressure source 21. The pistons 12, 30 and 40 are operated to close the blow-in hole 9 by the advancement of the valve member 17 in the first hydraulic cylinder 10, to close the flow-out passage 6 by the advancement of the valve member 33 in the second hydraulic cylinder 28 and to close the blow-in hole 37 by the advancement of the valve member 45 in the third hydraulic cylinder 38.

(b) The shut-off valves 23 and 49 are opened, and the high pressure supply sources 25 and 51 are operated to introduce a high pressure gas into the flow chambers 16 and 44.

(c) Molten synthetic resin R is injected from the injection nozzle through the gate 5 into the cavity 4. In this case, the flow-out passage 6 is maintained closed until the cavity 4 is filled up with the molten synthetic resin R. Therefore, the injection pressure is sufficiently applied to the molten synthetic resin R in the cavity 4 to smooth the contact surface of the molten synthetic resin R with an inner surface of the cavity 4. The contact surface is cooled by the mold 1 and hence is difficult to flow and ultimately forms a skin layer on a resulting hollow molded product.

The injection pressure of the molten synthetic resin R does not serve as a dwell pressure and hence, is set at a relatively low value, thereby inhibiting the generation of a flash.

(d) As shown in FIG. 4, the switchover valve 20 is shifted to a second switchover position F, so that the first hydraulic pressure chambers 13 and 31 in the first and second hydraulic cylinders 10 and 28 are connected to the hydraulic pressure source 21, and the second hydraulic pressure chambers 14 and 32 are connected to the oil tank 22. The pistons 12 and 30 are operated to open the blow-in hole 9 by the retreating movement of the valve member 17 in the first hydraulic cylinder 10 and to open the flow-out passage 6 by the retreating movement of the valve member 33 in the second hydraulic cylinder 28.

When the high pressure gas is blown through the blow-in hole 9 into the molten synthetic resin R, a void v is smoothly formed in the molten synthetic resin R, while permitting excessive resin r to flow through the flow-out passage 6 into the overflow chamber 7, thereby forming a hollow molded product M.

The inner side portion of the molten synthetic resin R the excessive resin r flowing into the overflow chamber 7 because the surface of the resin in contact with the inner surface of the cavity 4 is cooled by the forming mold 1 and is difficult to flow. Therefore, the surface of the molded product M cannot be roughened by such flowing out of the excessive resin. A high gas pressure is equally applied to the inside of the hollow molded product M and hence, the wall thickness of the hollow molded product M is made uniform.

(e) As shown in FIG. 5, after the excessive resin r fills substantially the overflow chamber 7, the switchover valve 48 is shifted to the second switchover position F, so that the first hydraulic pressure chamber 41 in the third hydraulic cylinder 38 is connected to the hydraulic pressure source 21, and the second hydraulic pressure chamber 42 is connected to the oil tank 22. The piston 40 is operated to open the blow-in hole 37 by the retreating movement of the valve member 45.

The high pressure gas is blown through the blow-in hole 37 into the excessive resin r, e.g., into a small void portion $v_1$ communicating with the void portion v in the illustrated embodiment, thereby increasing the volume of the small void portion $v_1$. Thus, a dwell pressure is applied to the hollow molded product M in accordance with the increase in volume of the small void portion $v_1$ and hence, the generation of a shrink mark in the hollow molded product M is remarkably inhibited by application of such dwell pressure.

In this manner, a hollow molded product M having a smooth outer surface and a uniform wall thickness can be produced.

Since the gas blow-in mechanism 8, the flow-out passage opening and closing mechanism 26 and the dwell pressure applying mechanism 36 are operated by a single common hydraulic pressure source 21, the apparatus can be made compact and facilitated. However, the mechanisms 8, 26 and 36 may be operated by separate actuating sources, respectively, if desired.

Figure 6:
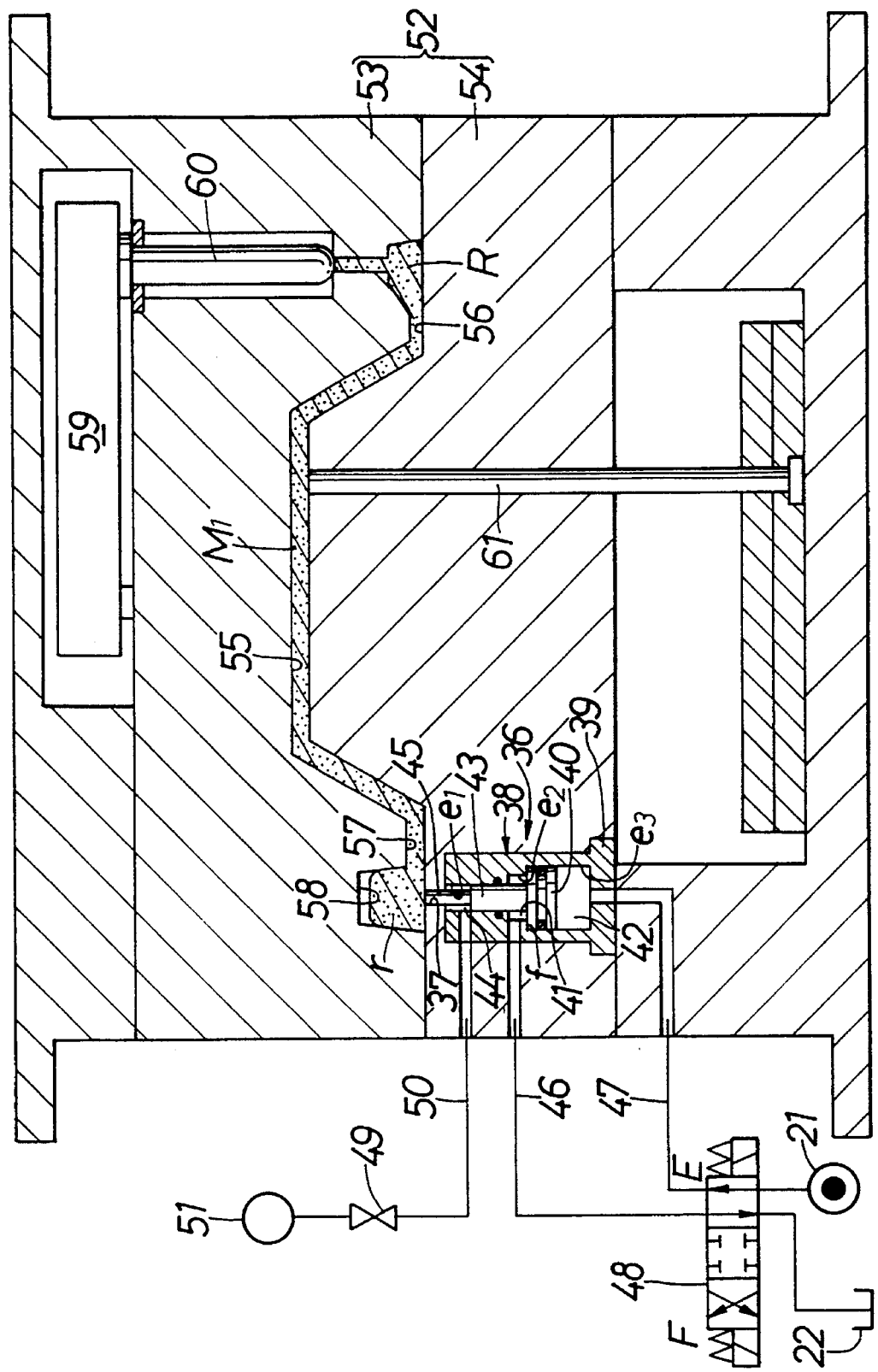
FIG. 6 is a longitudinal sectional view of a molding apparatus according to a third embodiment of the present invention, illustrating a condition in which molten synthetic resin has filled a cavity.
Figure 7:
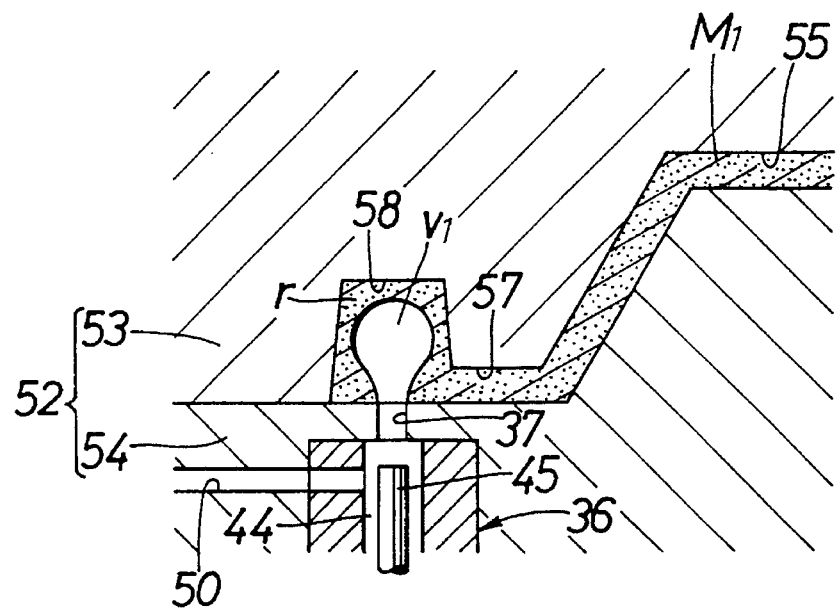
FIG. 7 is a longitudinal sectional view of an essential portion of the molding apparatus shown in FIG. 6, illustrating a condition in which a dwell pressure has been applied to a solid molded product.

FIGS. 6 and 7 illustrate a third embodiment of the present invention. The molding apparatus of the third embodiment is used for forming a solid molded product.

Referring to FIG. 6, a forming mold 52 is comprised of a stationary die 53 and a movable die 54. Both the dies 53 and 54 define a molding cavity 55, a gate 56 communicating with one end of the cavity 55, and an overflow chamber 58 communicating with the other end of the cavity 55 through a flow-out passage 57. A hot runner block 59 is mounted in the stationary die 53, and an injection nozzle 60 is also mounted in the stationary die 53 and connected to the hot runner block 59. The injection nozzle 60 communicates with the gate 56. A knock-out pin 61 is mounted in the movable die 54.

A dwell pressure applying mechanism 36 is mounted in the movable die 54 in the vicinity of the overflow chamber 58. The mechanism 36 is of the same structure as in the second embodiment. Therefore, the same components are designated by like reference characters and the description thereof is omitted. However, the gas blowing pressure of the high pressure gas supply source 51 may be lower than that in the second embodiment.

The operation of forming a solid molded product will be described below.

(a) As shown in FIG. 6, in a condition in which the mold 52 has been closed, the switchover valve 48 is maintained in its first switchover position E, so that the first hydraulic pressure chamber 41 in the third hydraulic cylinder 38 is connected to the oil tank 22, and the second hydraulic pressure chamber 42 is connected to the hydraulic pressure source 21. The piston 40 is operated to close the blow-in hole 37 by the advancement of the valve member 45 in the third hydraulic cylinder 38.

(b) The shut-off valve 49 is opened, and the high pressure gas supply source 51 is operated to introduce a high pressure gas into the flow chamber 44.

(c) A molten synthetic resin R is injected from the injection nozzle 60 through the gate 56 into the cavity 55. The resin R fills the cavity 55 and is molded to form a solid molded product $M_1$. Excessive resin r flows through the flow-out passage 57 into the overflow chamber 58.

In this case, the injection pressure of the molten synthetic resin R is set at a relatively low level such that a predetermined space remains in the overflow chamber 58. This inhibits the generation of a flash.

(d) As shown in FIG. 7, the switchover valve 48 is shifted to its second switchover position F, so that the first hydraulic pressure chamber 41 in the third hydraulic cylinder 38 is connected to the hydraulic pressure source 21, and the second hydraulic pressure chamber 42 is connected to the oil tank 22. The piston 40 is operated to open the blow-in hole 37 by the retreating movement of the valve member 45.

The high pressure gas is blown through the blow-in hole 37 in to the excessive resin r, thereby forming a small void portion $v_1$ in the excessive resin r. As the volume of the small void portion $v_1$ increases, a dwell pressure is applied to the solid molded product $M_1$.

The dwell pressure remarkably inhibits the generation of a shrink mark in the solid molded product $M_1$, leading to a smooth surface and a uniform thickness of the solid molded product $M_1$.

Figure 8:
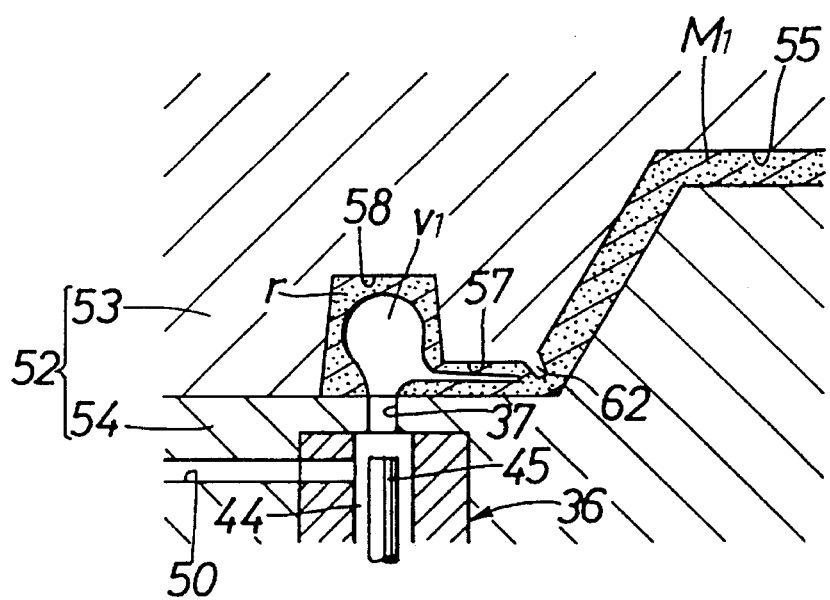
FIG. 8 is a longitudinal sectional view of an essential portion of a molding apparatus according to a fourth embodiment of the present invention, illustrating a condition in which a dwell pressure has been applied to a solid molded product.

FIG. 8 illustrates a modification to the mold 52 shown in FIG. 6, which includes a projection 62 provided at an entrance of the flow-out passage 57 for inhibiting the growth of the small void portion $v_1$ into the cavity 55. The inhibiting effect of the projection 62 reliably prevents cells from being formed in the solid molded product $M_1$.

Figure 9:
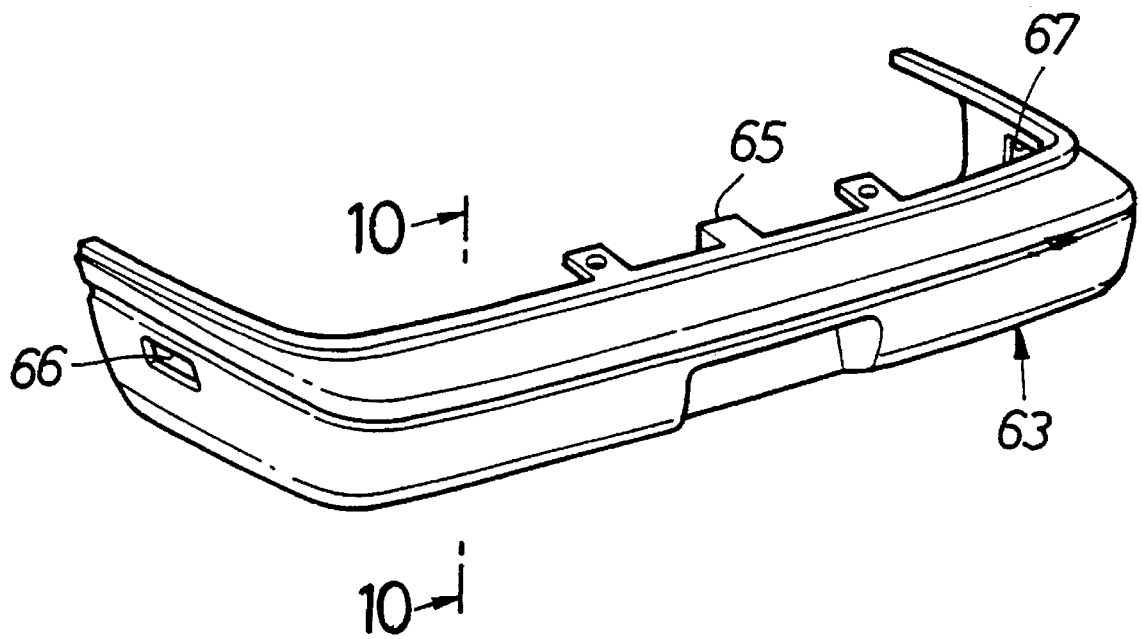
FIG. 9 is a perspective view of a rear bumper for an automobile.
Figure 10:
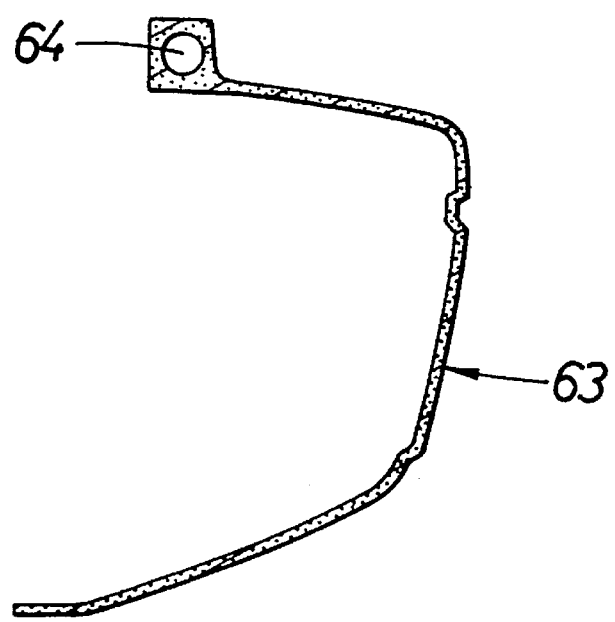
FIG. 10 is a sectional view taken along a line 10—10 in FIG. 9.

FIGS. 9 and 10 illustrate a rear bumper 63 for an automobile as a hollow molded product having a void in a portion thereof and made of synthetic resin. The rear bumper 63 has a wire harness insertion bore 64 at an upper edge thereof that extends along the upper edge, and a wire harness insertion opening 65 provided and connected to the lengthwise middle portion of the insertion bore 64. Opposite ends of the insertion bore 64 communicate with left and right side marker lamp mounting bores 66 and 67.

The first and second embodiments have an advantage that they are applicable to the molding of such a rear bumper 63 which is capable of accommodating a wire harness in a compact manner.

What is claimed is:

1. A molding apparatus for producing a synthetic resin molded product, comprising:

a forming mold including a molding cavity, a resin injection gate communicating with said molding cavity, and an overflow chamber communicating with said molding cavity at a position of the molding cavity remotest from said resin injection gate through a flow-out passage;

a first gas blow-in mechanism including a first gas blow-in hole for communicating with said molding cavity for blowing gas into a molten synthetic resin, which has been injected into said molding cavity through said resin injection gate, so as to form a void in said molten synthetic resin for molding a hollow molded product; and a flow-out passage opening and closing mechanism for opening and closing said flow-out passage; wherein said gas blow-in mechanism further includes a mechanism for opening and closing said first gas blow-in hole, said first gas blow-in hole opening and closing mechanism and said flow-out passage opening and closing mechanism closing the first gas blow-in hole and the flow-out passage, respectively, until said molten synthetic resin injected through said resin injection gate fills said molding cavity, and then opening said first gas blow-in hole and said flow-out passage, respectively, when said molding cavity is filled with said molten synthetic resin and said first gas blow-in mechanism is operated for blowing gas into said molten synthetic resin to form said void in the molten synthetic resin within said molding cavity and said overflow chamber, wherein said molding apparatus further includes a dwell pressure applying mechanism having a second gas blow-in hole open to said overflow chamber for blowing gas into the void within the overflow chamber thereby to apply a dwell pressure to said hollow molded product from inside of the product in a manner that the gas flow from said second gas blow-in hole is mixed with the gas flow inside the product from said first blow-in hole, said dwell pressure applying mechanism further includes a mechanism for opening and closing said second gas blow-in hole wherein said first gas blow-in hole opening and closing mechanism, said flow-out passage opening and closing mechanism, and said second gas blow-in hole opening and closing mechanism are operated from a common actuating source, and wherein a first switchover valve is interposed between said common actuating source and said first gas blow-in hole opening and closing mechanism as well as said flow-out passage opening and closing mechanism, whereas a second switchover valve is interposed between said common actuating source and said second gas blow-in hole opening and closing mechanism.

2. A molding apparatus according to claim 1, further including means for operating said second switchover valve to open said second blow-in hole after opening of the first blow-in hole and the flow-out passage by said first switchover valve.

* * * * *